United States Patent
Holloway

(10) Patent No.: US 10,717,386 B1
(45) Date of Patent: Jul. 21, 2020

(54) APPARATUS, SYSTEM, AND METHOD FOR CONNECTING A WIRING HARNESS TO A SECTIONAL DOOR

(71) Applicant: Graham Holloway, Santa Maria, CA (US)

(72) Inventor: Graham Holloway, Santa Maria, CA (US)

(*) Notice: Subject to any disclaimer, the term of this patent is extended or adjusted under 35 U.S.C. 154(b) by 253 days.

(21) Appl. No.: 16/042,471

(22) Filed: Jul. 23, 2018

(51) Int. Cl.
| | | |
|---|---|---|
| *B60Q 3/217* | (2017.01) | |
| *B60Q 3/30* | (2017.01) | |
| *B60Q 3/43* | (2017.01) | |
| *E06B 3/48* | (2006.01) | |
| *F21V 33/00* | (2006.01) | |
| *F21Y 115/10* | (2016.01) | |
| *F21S 2/00* | (2016.01) | |
| *F21S 8/00* | (2006.01) | |
| *F21V 17/10* | (2006.01) | |

(52) U.S. Cl.
CPC ............. *B60Q 3/217* (2017.02); *B60Q 3/30* (2017.02); *B60Q 3/43* (2017.02); *E06B 3/485* (2013.01); *F21V 33/006* (2013.01); *F21S 2/00* (2013.01); *F21S 8/031* (2013.01); *F21V 17/107* (2013.01); *F21Y 2115/10* (2016.08)

(58) Field of Classification Search
CPC . B60Q 3/217; B60Q 3/50; B60Q 3/30; B60Q 3/43; E06B 3/485; F21V 33/006; F21V 17/107; F21Y 2115/10; F21S 2/00; F21S 8/131; F21S 8/031
See application file for complete search history.

(56) References Cited

U.S. PATENT DOCUMENTS

| | | | | |
|---|---|---|---|---|
| 1,990,870 A | * | 2/1935 | Kelly | E05D 15/246 160/194 |
| 2,093,019 A | * | 9/1937 | Norberg | E05D 13/1261 160/191 |
| 2,721,610 A | * | 10/1955 | Grandgent | E06B 3/483 160/190 |
| 2,786,523 A | * | 3/1957 | Phillips | B61D 19/002 160/191 |
| 5,533,561 A | * | 7/1996 | Forehand, IV | E05B 47/026 160/188 |

(Continued)

OTHER PUBLICATIONS

U.S. Appl. No. 29/659,689, Graham Holloway.

*Primary Examiner* — Timothy J Thompson
*Assistant Examiner* — Rhadames Alonzo Miller
(74) *Attorney, Agent, or Firm* — Ted Masters

(57) ABSTRACT

Apparatus for connecting a wiring harness to a sectional door is disclosed. The sectional door has a plurality of panels in which adjacent panels are connected by a hinge, the hinge is connected to the adjacent panels by first and second hinge connectors. The apparatus includes a first bracket which has a proximal end and an opposite distal end, the distal end is shaped and dimensioned to receive the wiring harness. The proximal end of the first bracket is connectable to the hinge by the first hinge connector. A second bracket has a proximal end and an opposite distal end, the distal end is shaped and dimensioned to receive the wiring harness. The proximal end of the second bracket is connectable to the hinge by the second hinge connector. The wiring harness is connected to the distal ends of the first and second brackets, thereby providing strain relief for the wiring harness.

21 Claims, 12 Drawing Sheets

(56) References Cited

U.S. PATENT DOCUMENTS

| | | | |
|---|---|---|---|
| 6,543,608 B2* | 4/2003 | Ledingham | B65G 21/2072 198/836.3 |
| 7,234,502 B2* | 6/2007 | O'Malley | E05D 13/1261 160/191 |
| 7,721,387 B1* | 5/2010 | Mullet | E05D 15/24 16/94 R |
| 9,976,738 B1* | 5/2018 | Holloway | B60Q 3/217 |
| 2001/0052203 A1* | 12/2001 | Doshita | B60R 16/0215 49/502 |
| 2003/0222183 A1* | 12/2003 | Kato | H02G 3/0487 248/49 |
| 2005/0139332 A1* | 6/2005 | O'Malley | E05D 13/1261 160/191 |
| 2007/0158092 A1* | 7/2007 | Ogawa | H02G 3/0475 174/19 |
| 2009/0008991 A1* | 1/2009 | Ushiyama | B60R 16/0207 307/10.1 |
| 2009/0044455 A1* | 2/2009 | Enomoto | B60R 16/0207 49/360 |
| 2010/0147586 A1* | 6/2010 | Pieh | E05F 15/655 174/99 R |
| 2017/0005461 A1* | 1/2017 | Hartwig | E05F 15/632 |

* cited by examiner

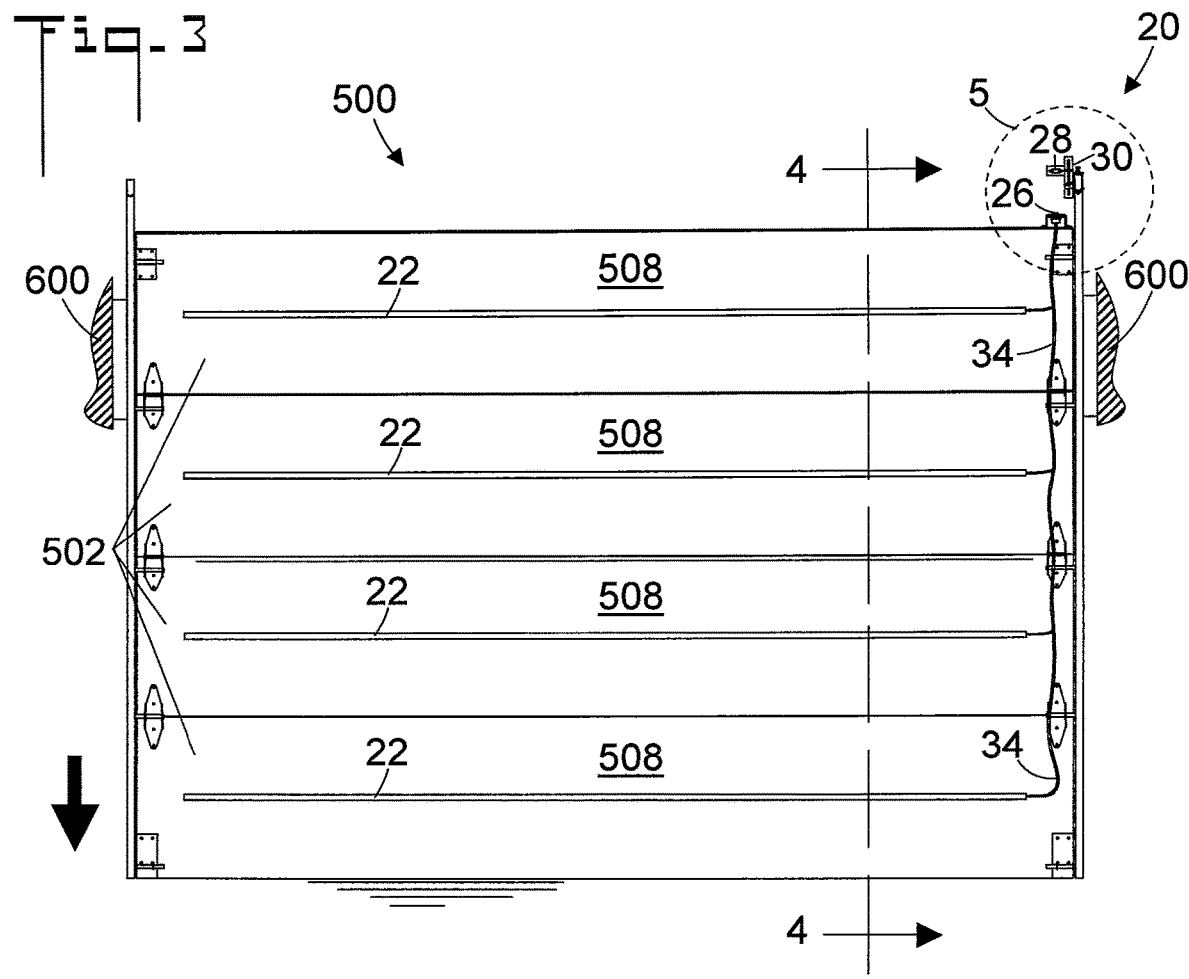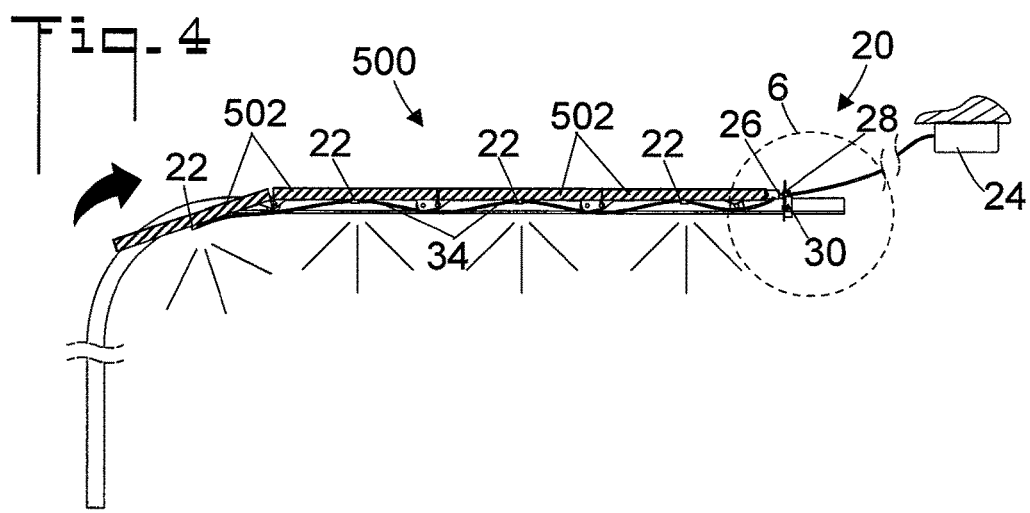

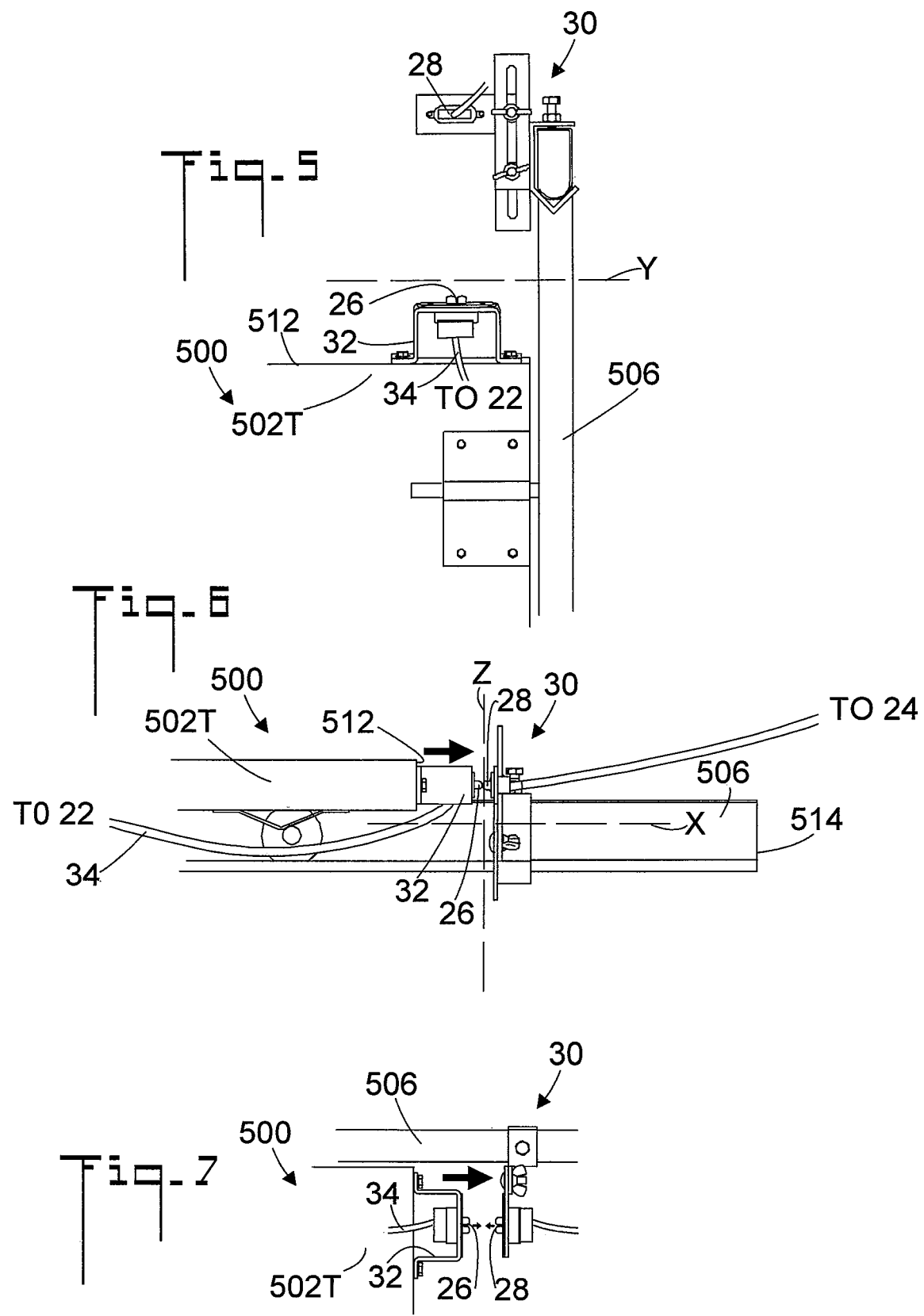

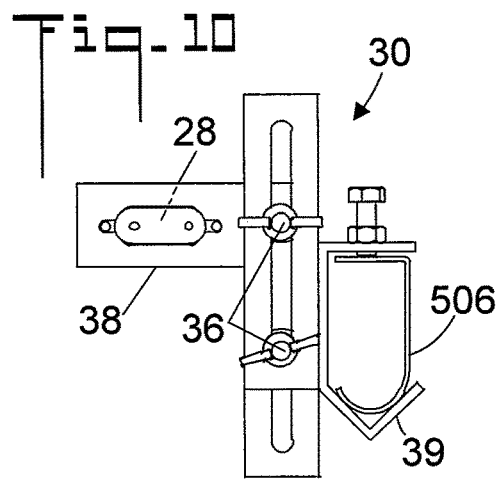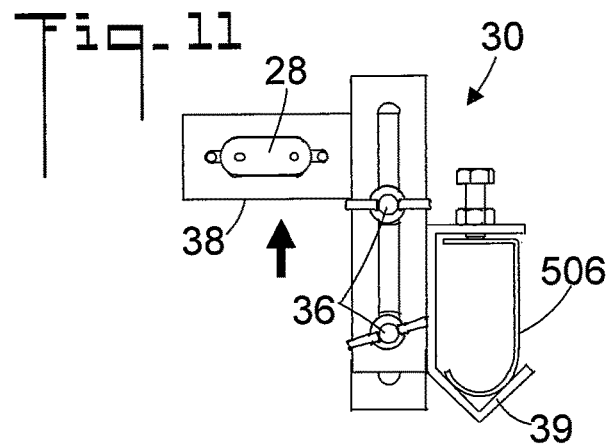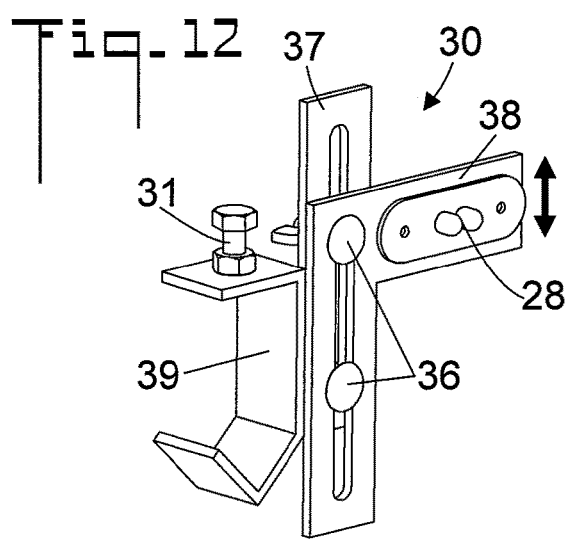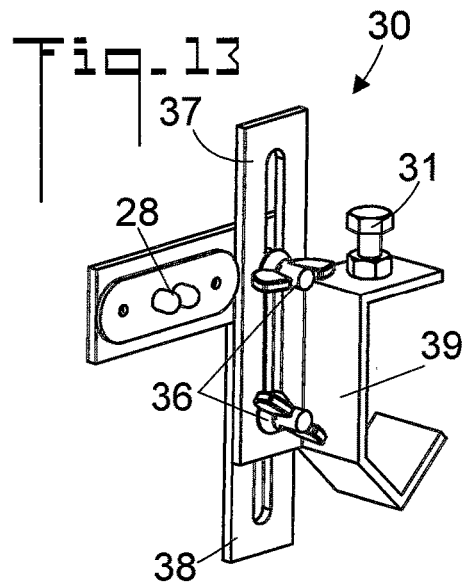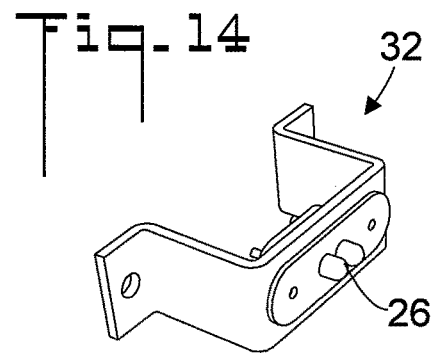

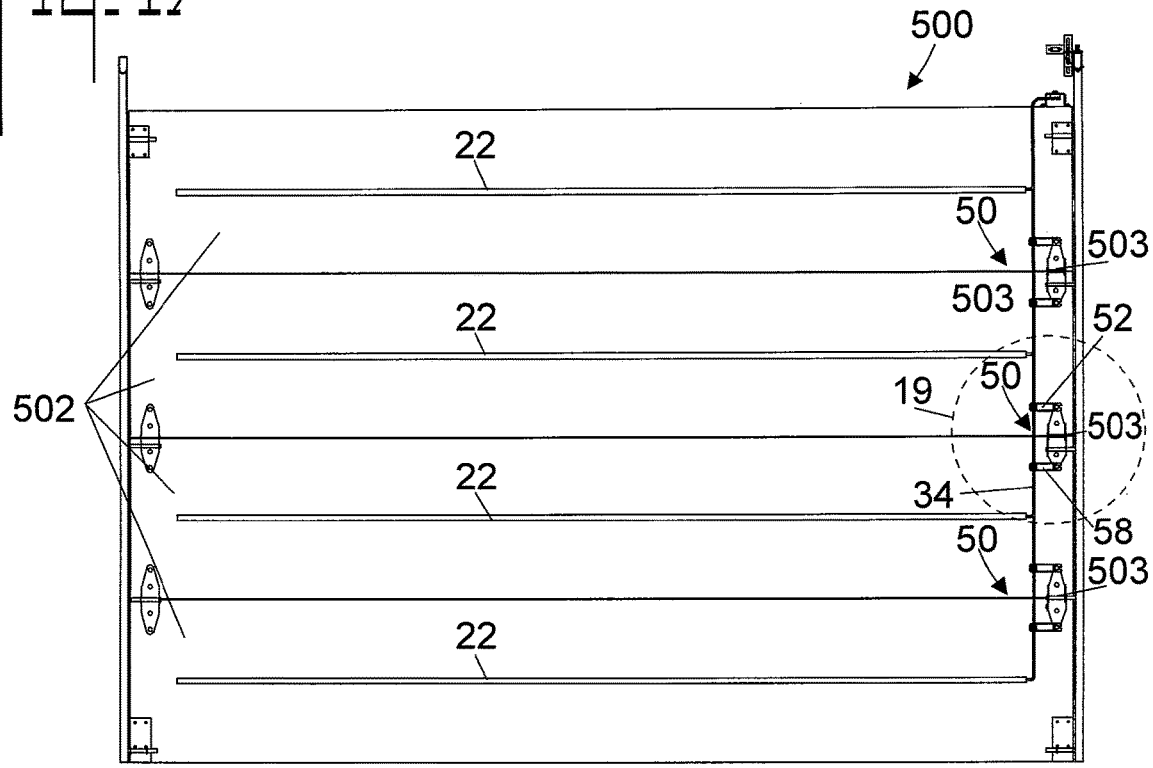
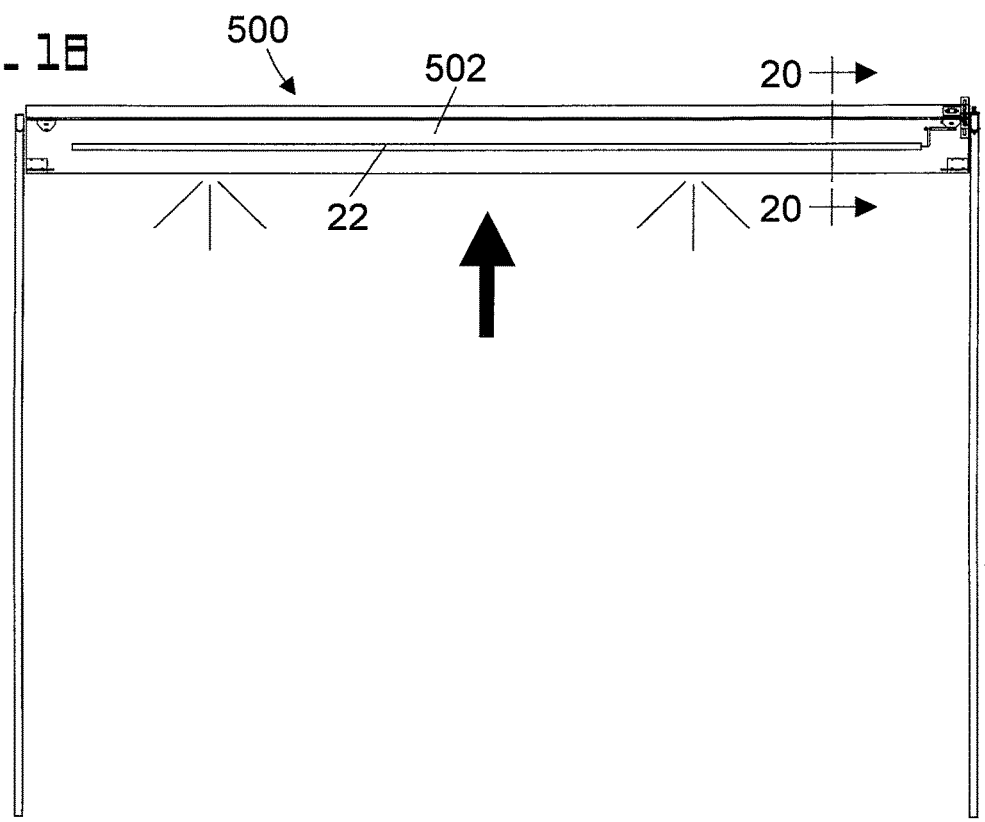

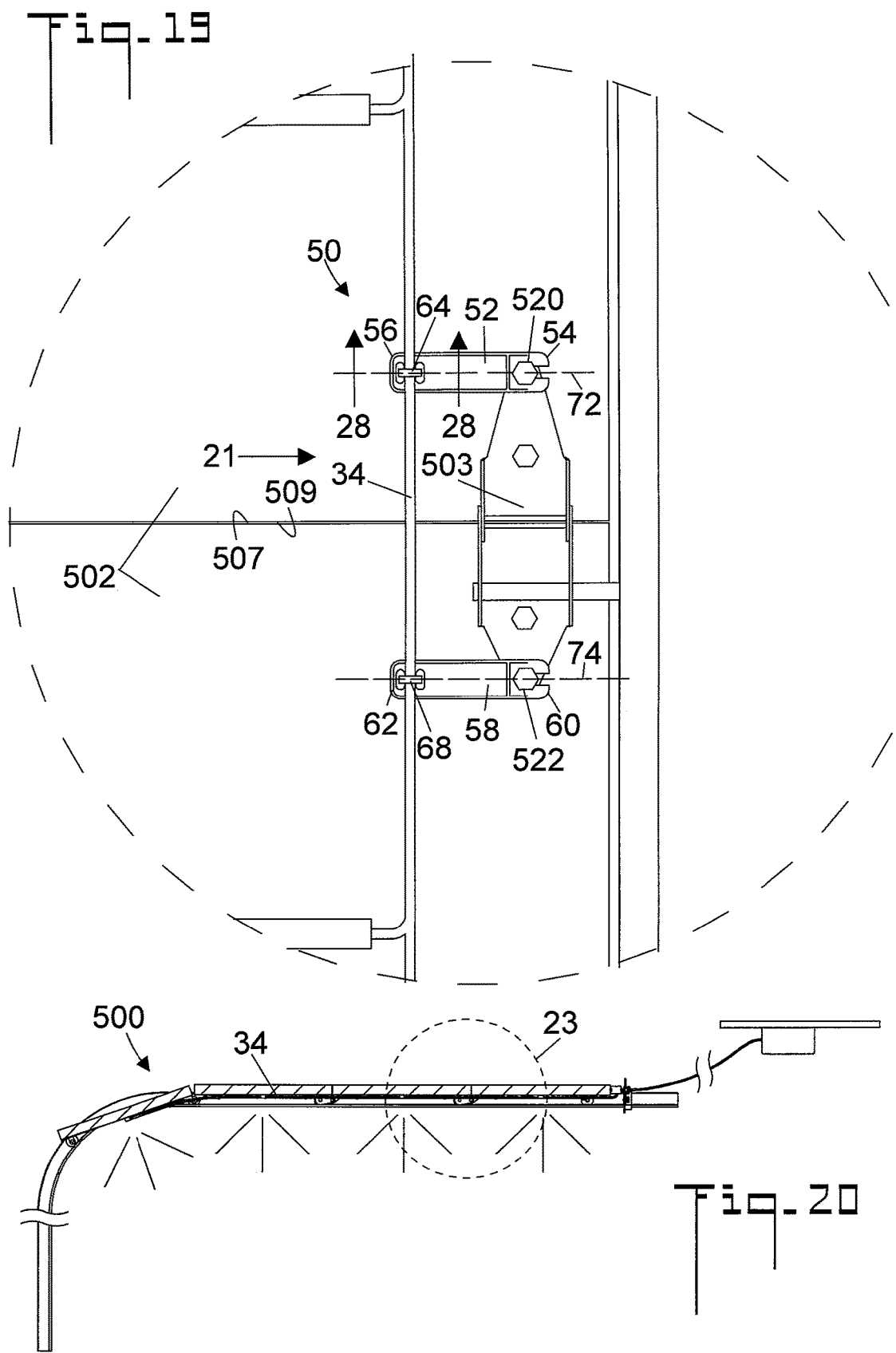

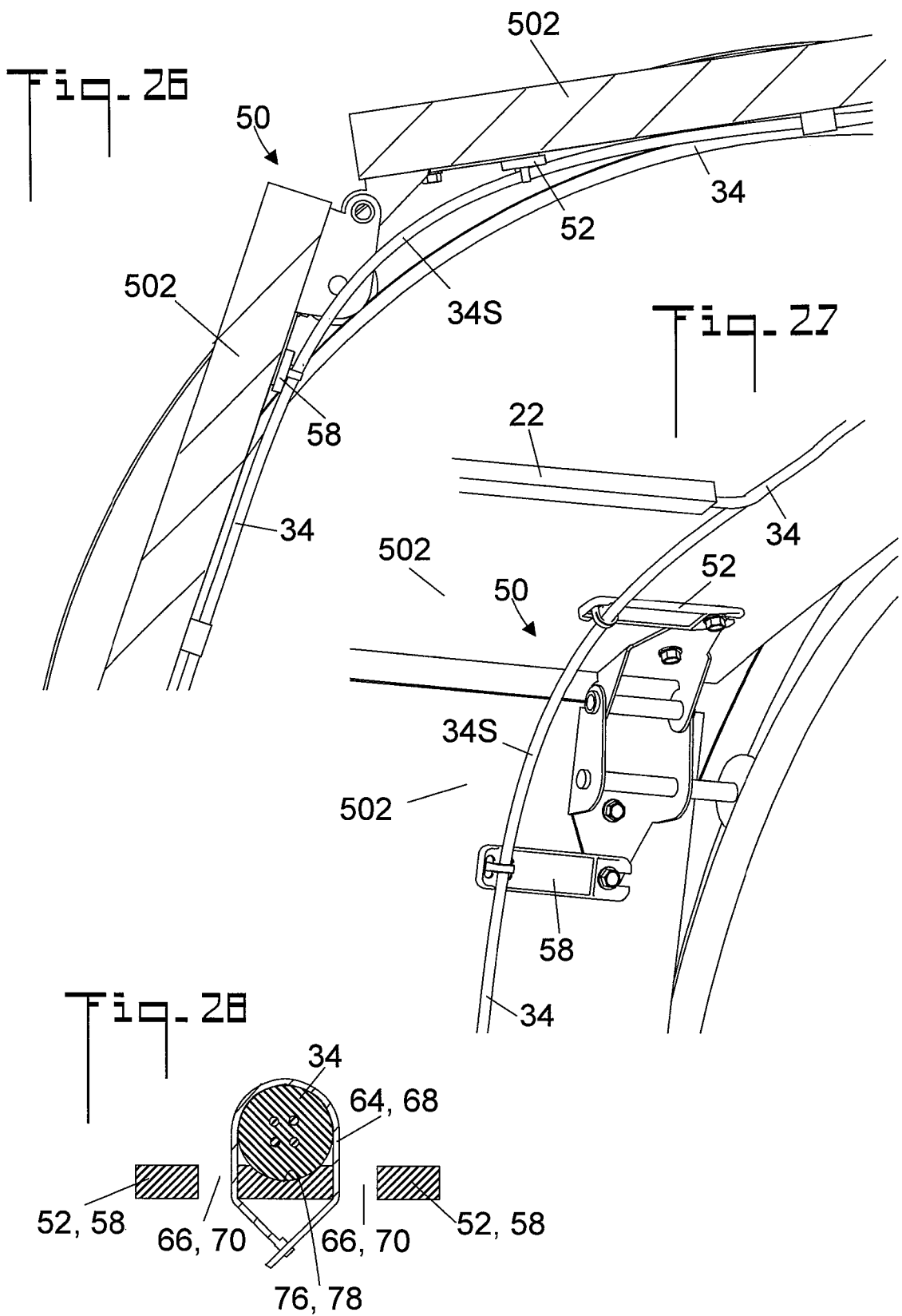

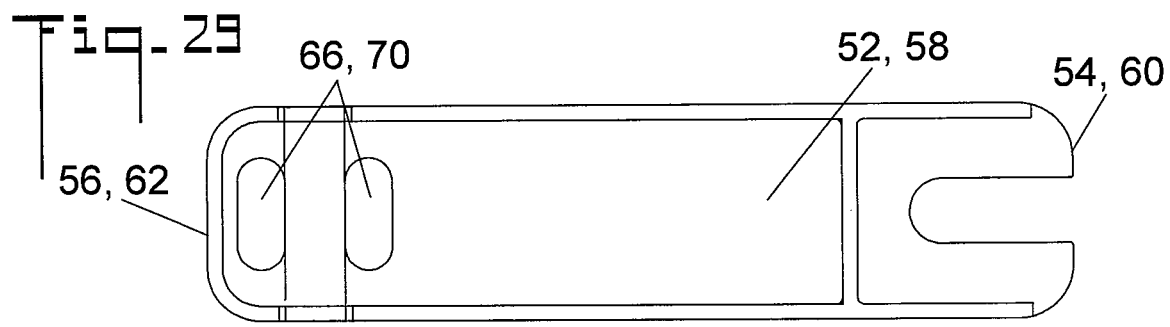
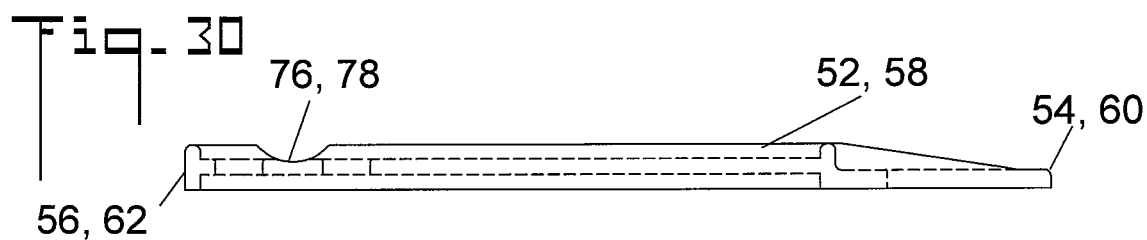
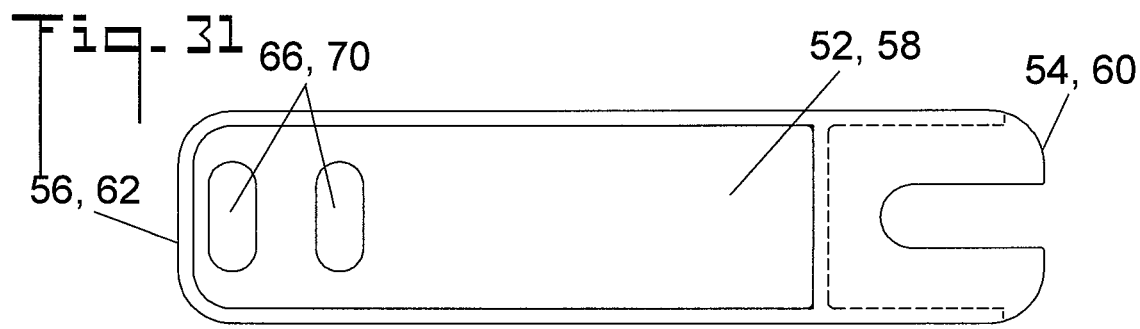
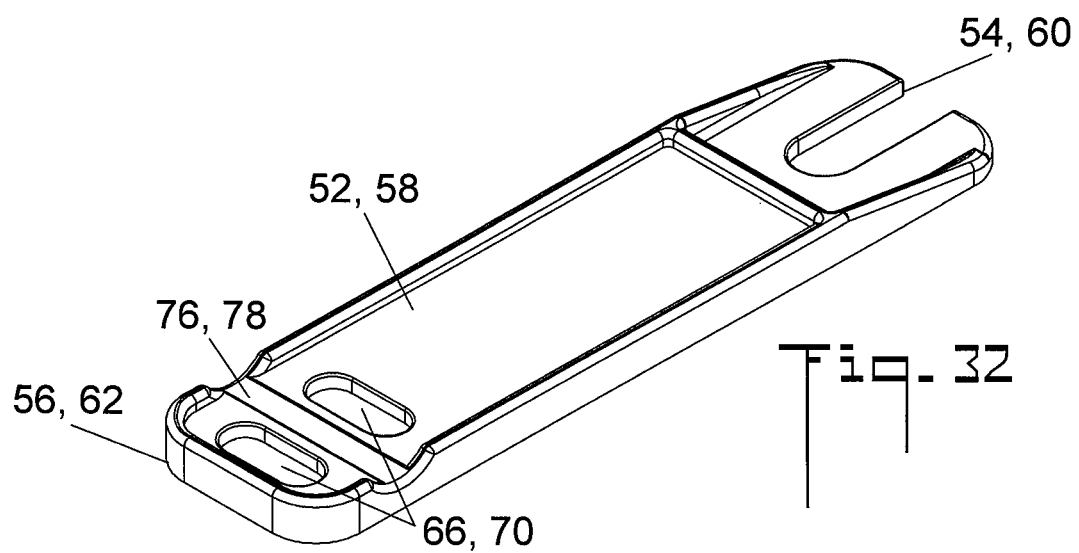

APPARATUS, SYSTEM, AND METHOD FOR CONNECTING A WIRING HARNESS TO A SECTIONAL DOOR

CROSS REFERENCE TO RELATED APPLICATION

Application Ser. No. 15/629,245 now U.S. Pat. No. 9,976,738, which is hereby incorporated by reference.

TECHNICAL FIELD

The present invention pertains generally to sectional doors, and more particularly to an apparatus, system, and method for connecting a wiring harness to the sectional door.

BACKGROUND OF THE INVENTION

Sectional doors are well known in the art, and consist of several hinge-connected panels which slide from a closed vertical position to an open horizontal overhead position. Each panel has rollers on its side edges which move in door tracks mounted to a structure. Sectional doors are typically used in fixed structures such as home garages and commercial buildings, and also in mobile structures such as trucks and delivery vans. A motorized opening and closing mechanism can be connected near the top of the door to effect the opening and closing action. A problem however exists with sectional doors. When the door is in the open horizontal overhead position, the door blocks light from light fixtures which are mounted on the ceiling of the structure.

U.S. Pat. No. 9,976,738 (which is hereby included by reference) discloses a lighting system attaches to a sectional door which solves the aforementioned problem. The sectional door has a plurality of hinge-connected panels which roll along left and right tracks which are connected to a structure. Each panel has an inside surface. The sectional door is positionable to a closed position and to an open position. The lighting system includes a light which connects to the inside surface of a panel of the sectional door. A movable electric contactor connects to a panel of the sectional door, and a fixed electric contactor connects to the structure. A holder carries the fixed contactor, the holder is shaped and dimensioned to removably connect to either the left track or to the right track. In the open position of the sectional door the movable electric contactor is configured to contact the fixed electric contactor and energize the light.

BRIEF SUMMARY OF THE INVENTION

FIGS. 1-16 and the associated description disclose a lighting system for a sectional door. FIGS. 17-32 and the associated description disclose the present invention which is directed to an apparatus, system, and method for connecting a wiring harness to the sectional door.

In accordance with an embodiment, a sectional door has a plurality of panels in which adjacent panels are connected by a hinge. The hinge is connected to the adjacent panels by first and second hinge connectors. Apparatus for connecting a wiring harness to the sectional door includes a first bracket which has a proximal end and an opposite distal end, the distal end is shaped and dimensioned to receive the wiring harness. The proximal end of the first bracket is connectable to the hinge by the first hinge connector. The apparatus further includes a second bracket which has a proximal end and an opposite distal end, the distal end is shaped and dimensioned to receive the wiring harness. The proximal end of the second bracket is connectable to the hinge by the second hinge connector. The distal end of the first bracket and the distal end of the second bracket are each configured to connect to the wiring harness.

In accordance with another embodiment, the proximal end of the first bracket is bifurcated, and the proximal end of the second bracket is bifurcated.

In accordance with another embodiment, the distal end of the first bracket has a first groove which is shaped and dimensioned to partially receive the wiring harness, and the distal end of the second bracket has a second groove which is shaped and dimensioned to partially receive the wiring harness.

In accordance with another embodiment, the distal end of the first bracket has two apertures, and the distal end of the second bracket has two apertures.

In accordance with another embodiment, a first connector is configured to connect the wiring harness to the distal end of the first bracket. The first connector is positionable through the two apertures in the distal end of the first bracket. A second connector is configured to connect the wiring harness to the distal end of the second bracket. The second connector is positionable through the two apertures in the distal end of the second bracket.

In accordance with another embodiment, the first connector is a zip tie, and the second connector is a zip tie.

In accordance with another embodiment, the adjacent panels each have a horizontal edge. The first bracket has a first longitudinal axis, and the second bracket has a second longitudinal axis. The first longitudinal axis and the second longitudinal axis are both configured to be disposed parallel to the horizontal edges of the adjacent panels.

Other embodiments, in addition to the embodiments enumerated above, will become apparent from the following detailed description, taken in conjunction with the accompanying drawings, which illustrate, by way of example, the principles of the apparatus, system, and method for connecting a wiring harness to a sectional door.

BRIEF DESCRIPTION OF THE DRAWINGS

FIG. 3 is an elevation view of the inside of the prior art sectional door with a lighting system installed;

FIG. 4 is a cross sectional view along the line 4-4 of FIG. 3 showing the sectional door in an open substantially horizontal overhead position with the lighting system installed;

FIG. 5 is an enlarged view of area 5 of FIG. 2;

FIG. 6 is an enlarged view of area 6 of FIG. 3;

FIG. 7 is a top plan view as in FIG. 6 just before electric contact is made;

FIG. 10 is an enlarged rear elevation view of a holder which carries the fixed contactor;

FIG. 11 is an enlarged rear elevation view of the holder adjusted so that the fixed electric contactor is in a different vertical position;

FIG. 12 is an enlarged front perspective view of the holder;

FIG. 13 is an enlarged perspective view of the holder in a reversed configuration;

FIG. 14 is an enlarged front perspective view of a door holder;

FIG. 17 is an elevation view of the inside of a prior art sectional door showing the door in a closed substantially vertical position;

FIG. 18 is an elevation view of the inside of a prior art sectional door showing the door in an open substantially horizontal position;

FIG. 19 is an enlarged view of area 19 of FIG. 17;

FIG. 20 is a cross sectional view along the line 20-20 of FIG. 18 showing the sectional door in an open substantially horizontal overhead position;

FIG. 26 is an enlarged view of area 26 of FIG. 25;

FIG. 27 is a perspective view of FIG. 26;

FIG. 28 is an enlarged cross sectional view along the line 28-28 of FIG. 19;

FIG. 29 is a top plan view of a bracket;

FIG. 30 is a side elevation view of the bracket;

FIG. 31 is a bottom plan view of the bracket; and,

FIG. 32 is a perspective view of the bracket.

DETAILED DESCRIPTION OF THE INVENTION

Figure 1:
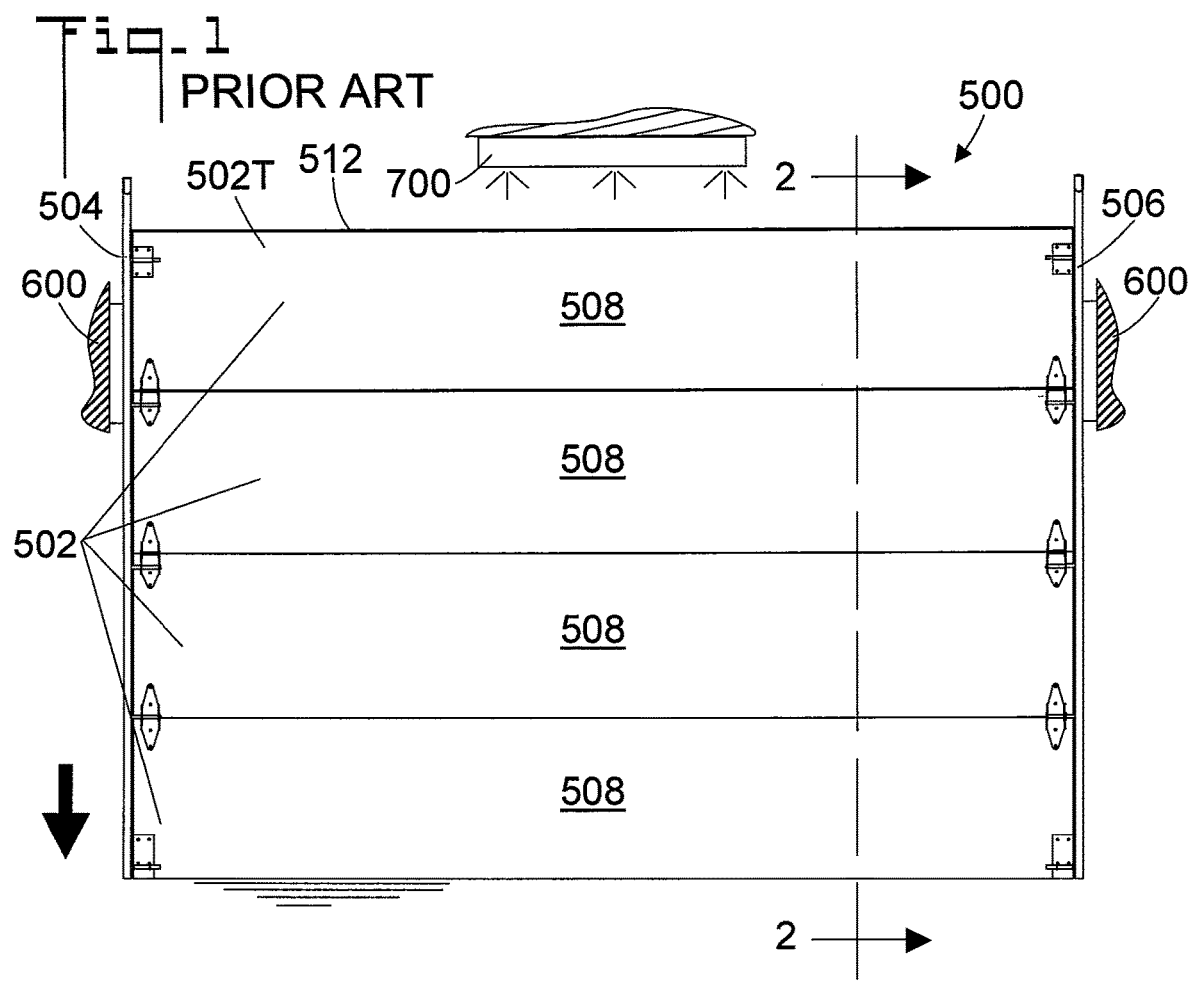
FIG. 1 is an elevation view of the inside of a prior art sectional door showing the door in a closed substantially vertical position.
Figure 2:
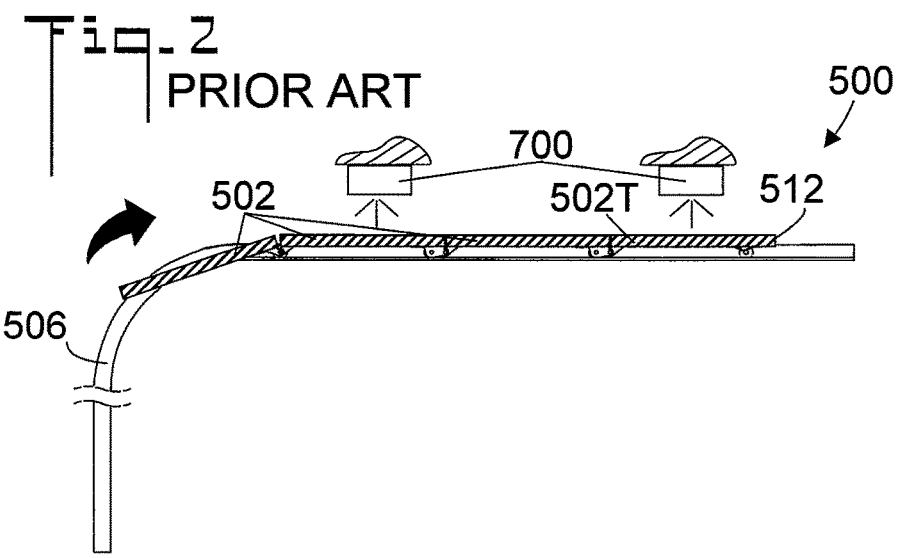
FIG. 2 is a cross sectional view along the line 2-2 of FIG. 1 showing the sectional door in an open substantially horizontal overhead position.

Referring initially to FIG. 1 there is illustrated an elevation view of the inside of a prior art sectional door 500 showing the door in a closed substantially vertical position. FIG. 2 is a cross sectional view along the line 2-2 of FIG. 1 showing the sectional door in an open substantially horizontal overhead position. Sectional door 500 includes a plurality of connected panels 502 which roll along left 504 and right 506 tracks which are connected to a structure 600 (e.g. a building such as a garage or warehouse, or to a mobile structure (vehicle) such as a truck or delivery van). Each panel 502 has an inside surface 508. Panels 502 include a topmost panel 502T which has a top edge 512. Sectional door 500 is positionable to the closed position of FIG. 1, and to the open position of FIG. 2. It is noted that in the open position sectional door 500 blocks light coming from light fixtures 700. It is noted that a view in the opposite direction of FIG. 2 would be the mirror image.

FIG. 3 is an elevation view of the inside of the prior art sectional door 500 with a lighting system 20 installed, and FIG. 4 is a cross sectional view along the line 4-4 of FIG. 3. FIG. 5 is an enlarged view of area 5 of FIG. 3, FIG. 6 is an enlarged view of area 6 of FIG. 4, and FIG. 7 is a top plan view FIG. 6. Lighting system 20 includes a light 22 which is connectable to the inside surface 508 of a panel 502 of sectional door 500. As used herein the term "light" is defined as a device which produces light (e.g. a light bulb). In the shown embodiment, there are a plurality of lights 22, wherein one light 22 is connectable to each of the plurality of panels 502. Lights 22 are powered by a power supply 24. In an embodiment each light 22 includes a long strip (string) containing multiple lights (e.g. bulbs) which longitudinally extends along the panel 502. For a garage door application the strips can be about 16 feet long and therefore provide a large lighted area. The strips can be connected to the inside surface 508 of panel 502 with an adhesive or by other mechanical means. In an embodiment, light 22 includes a plurality of low voltage LED lights, such as high intensity daylight white 6000k 5050 LED chip light strips. These lights are powered by a 12 VDC 30A regulated power supply 24. Power supply 24 can be a separate unit as shown, or in some installations low voltage power can be taken from the door's motorized opening and closing mechanism. As used here the term low voltage means a voltage which is 0 to 49 volts.

Lighting system 20 further includes a movable electric contactor 26 which is connectable to a panel 502 (topmost panel 502T as shown) of sectional door 500. Lighting system 20 further includes a fixed electric contactor 28 which is connectable to the structure 600. As used herein the term "connectable to the structure" means either directly connectable or indirectly connectable. In the open position of the sectional door (FIGS. 4 and 6) movable electric contactor 26 is configured to contact fixed electric 28 contactor and thereby complete an electrical circuit which energizes light 22. In an embodiment the movable 26 and fixed 28 contactors are two pole low voltage electrical contacts. The contacts are made of metal and are longitudinally spring-biased to an extended position so that they maintain electrical contact with the opposing contacts (refer to small arrows on FIG. 7).

A holder 30 carries fixed contactor 28 (also refer to FIGS. 9-13). Holder 30 is shaped and dimensioned to removably connect to either the left track 504 or to the right track 506. In the shown embodiment, holder 30 is fixedly connected to track 504 or 506 with a bolt 31.

Referring specifically to FIGS. 5 and 6, movable electric contactor 26 is connectable to the topmost panel 502T of sectional door 500. In the shown embodiment a door holder 32 carries movable electric contactor 26. Door holder 32 is connectable to the top edge 512 of the topmost panel 502T such as with screws. Referring to FIG. 6, in the open position of sectional door 500, topmost panel 502T moves in the direction of the arrow so that movable electric contactor 26 contacts fixed electric contactor 28 to complete the lighting circuit. FIG. 7 shows moving contactor 26 moving in the direction of the arrow toward fixed contactor 28 just before the electrical connection is made.

Lighting system 20 further includes a wiring harness 34 which connects movable contactor 26 to light(s) 22. Harness 34 is mounted to the inside surface 508 of door panels 502 in such a way that it freely moves as the door panels 502 separate and transition from the vertical to horizontal position and back again during opening and closing operation. Harness 34 is can be connected to the door panels 502 by an adhesive or other mechanical means.

Figure 8:
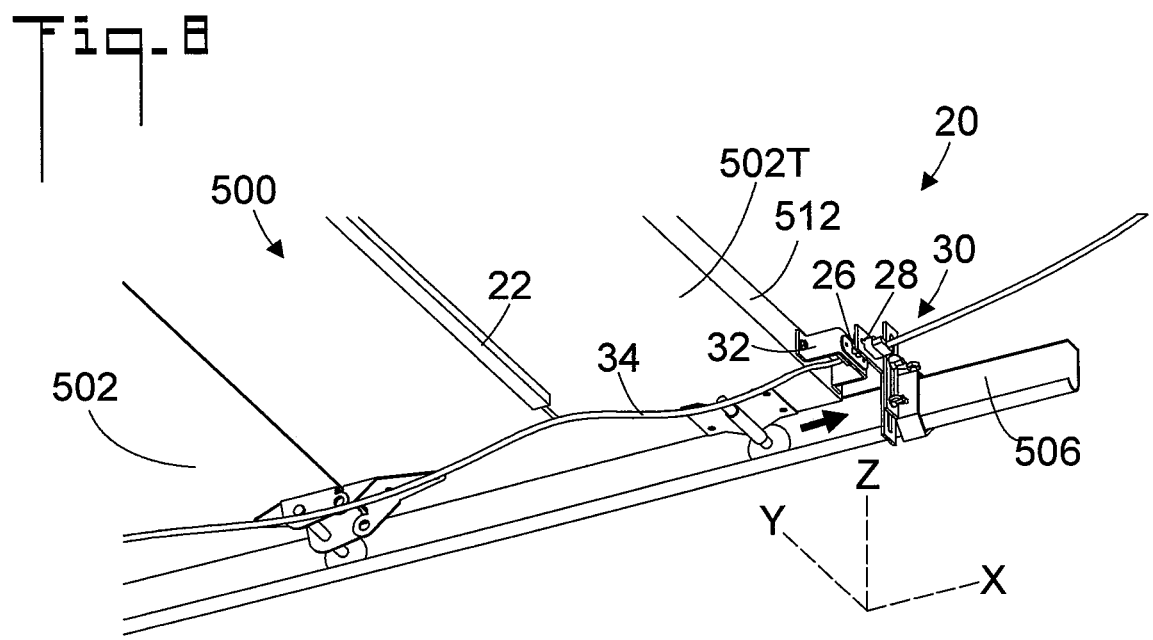
FIG. 8 is an enlarged bottom perspective view of a movable electric contactor making contact with a fixed electric contactor.

FIG. 8 is an enlarged bottom perspective view of movable electric contactor 26 making contact with fixed electric contactor 28. Fixed electric contactor 28 is mounted to holder 30 which is connected to right track 506. Movable electric contactor 26 is mounted to door holder 32 which is connected to the top edge 512 of the topmost panel 502T of sectional door 500. Sectional door 500 is in the open horizontal overhead position wherein movable electric contactor 26 contacts fixed electric contactor 28 to complete the electrical circuit which energizes lights 22. Mutually perpendicular alignment axes X, Y, and Z are also shown (also refer to FIGS. 5 and 6).

Figure 9:
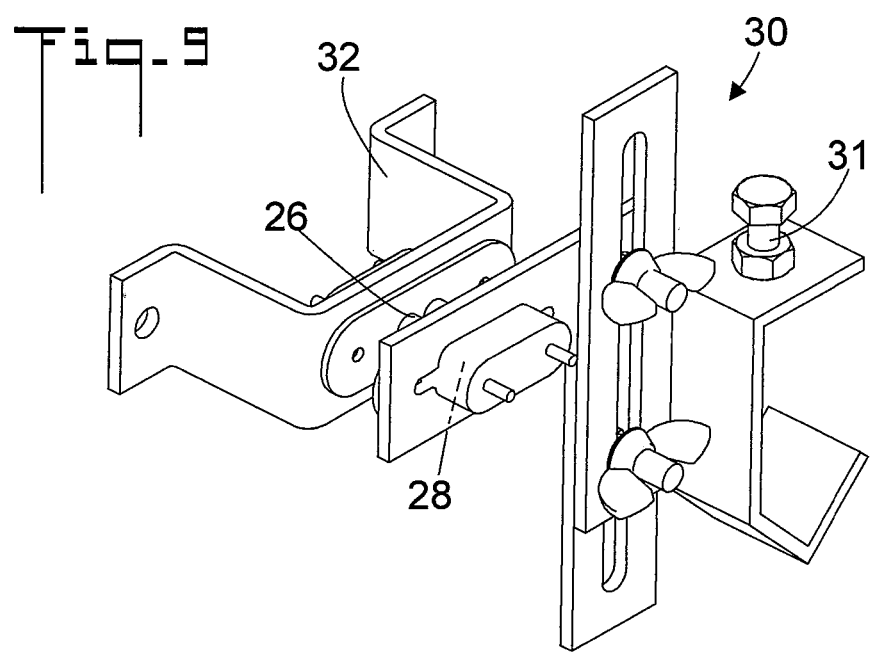
FIG. 9 is an enlarged top perspective view of the movable and fixed electric contactors.

FIG. 9 is an enlarged top perspective view of movable 26 and fixed 28 electric contactors. Movable contactor 26 is carried by door holder 32, and is connected by wiring harness 34 to lights 22 (refer also to FIG. 6). Fixed electric contactor 28 is carried by holder 30 and is electrically connected to low voltage power supply 24 (refer also to FIG. 6). Contactor 28 has prongs which receive a plug which is connected to power supply 24. Similarly contactor 26 has prongs which receive a plug connected to harness 34).

FIG. 10 is an enlarged rear elevation view of holder 30 which carries fixed contactor 28, and FIG. 11 is an enlarged rear elevation view of holder 30 adjusted so that fixed electric contactor 28 is in a different vertical position. Holder 30 is adjustable so that fixed electric contactor 28 is positionable to vertically align with movable electric contactor 26 (also refer to FIG. 6 and the double arrow of FIG. 12). In the shown embodiment the vertical adjustment is effected by two wing nuts 36. When loosened wing nuts 36 allow the bracket 38 upon which fixed electric contactor 28 is mounted to be vertically positioned so that fixed electric contactor 28 vertically aligns with movable electric contactor 26. This adjustment is necessary because the vertical position of sectional door 500 with respect to tracks 504 and 506 can vary from installation to installation (also refer to FIGS. 1 and 2).

FIG. 12 is an enlarged front perspective view of holder 30. Shown are fixed electric contactor 28, bolt 31, wing nuts 36, and bracket 38. It is noted that holder 30 has a body 39 which is configured to connect to left track 504 or right track 506 (in the shown embodiment body 39 partially fits around the tracks). A slide 37 is connected to body 39. Bracket 38 carries fixed electric contactor 28 and is connected to slide 37 by wing nuts 36. Bracket 38 is slidably connected to body 39 by slide 37 so that fixed electric contactor 28 is positionable (refer to arrows) to a desired vertical position. Also referring to FIG. 6, in an embodiment body 39 is shaped and dimensioned to fit over the end 514 of track 504 or 506.

FIG. 13 is an enlarged perspective view of holder 30 in a reversed configuration. Holder 30 is reversible so that it can be connected to either left track 504 or right track 506. In the shown embodiment, to reverse holder 30 the plastic housing of contactor 28 is disconnected from bracket 38, turned 180°, and reconnected on the opposite side of bracket 38.

FIG. 14 is an enlarged front perspective view of door holder 32 and movable electric contactor 26.

Figure 15:
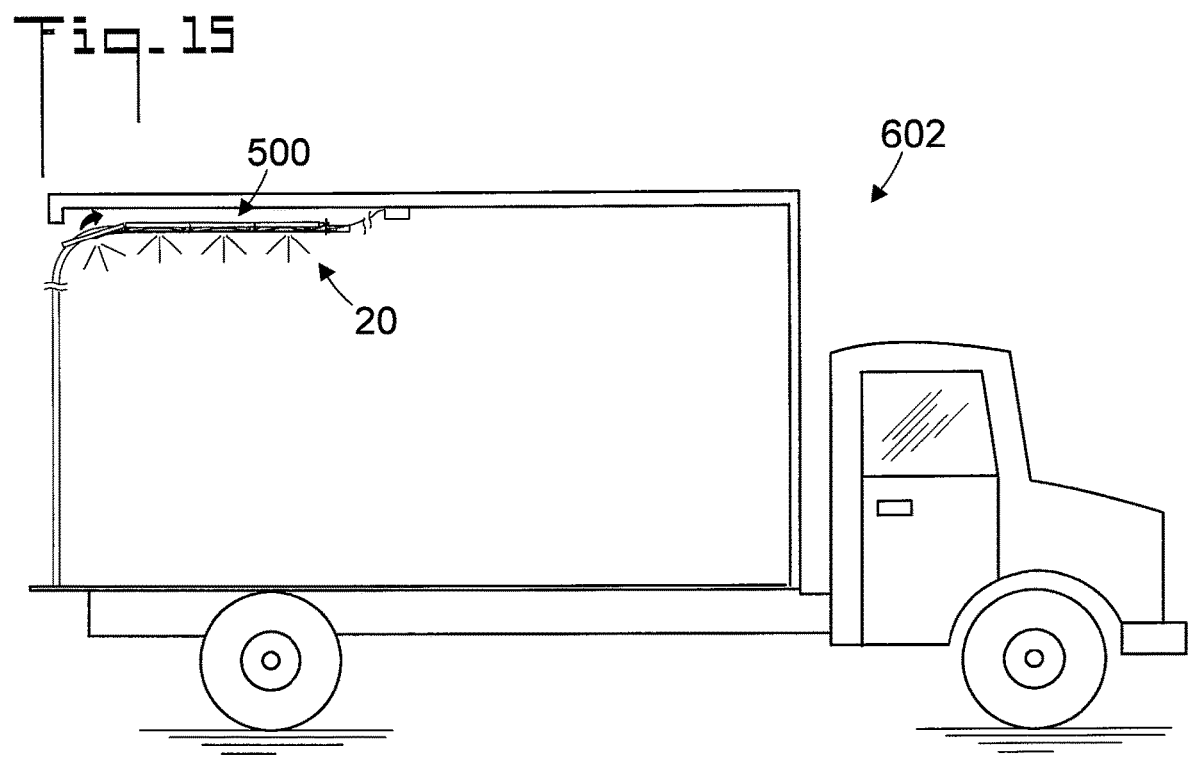
FIG. 15 is a cutaway view of the lighting system installed on a movable structure.

FIG. 15 is a cutaway view of lighting system 20 installed on the sectional door 500 of a movable structure 602 such as a truck or delivery van.

Figure 16:
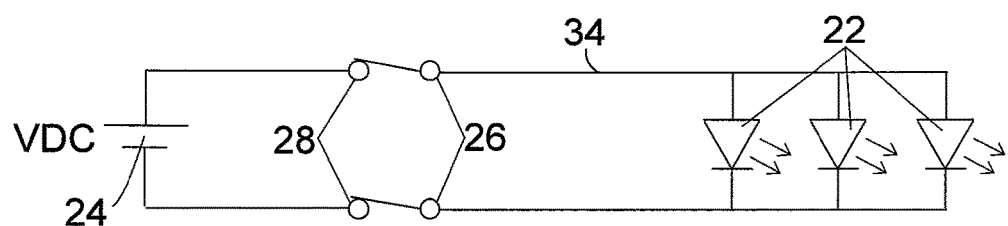
FIG. 16 is a schematic diagram of the lighting system.
Figure 21:
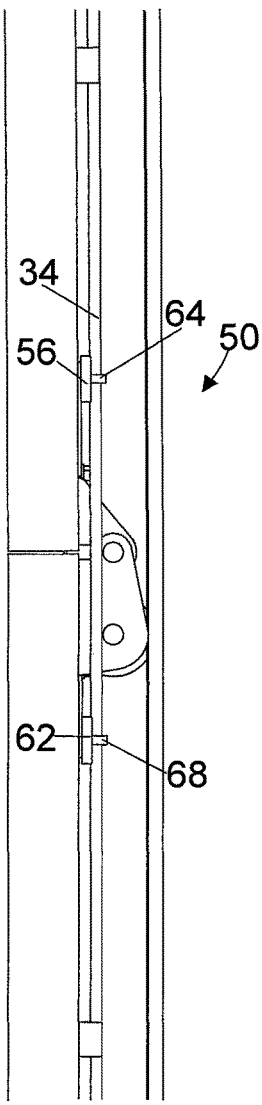
FIG. 21 is an enlarged fragmented view in direction 21 of FIG. 17.
Figure 22:
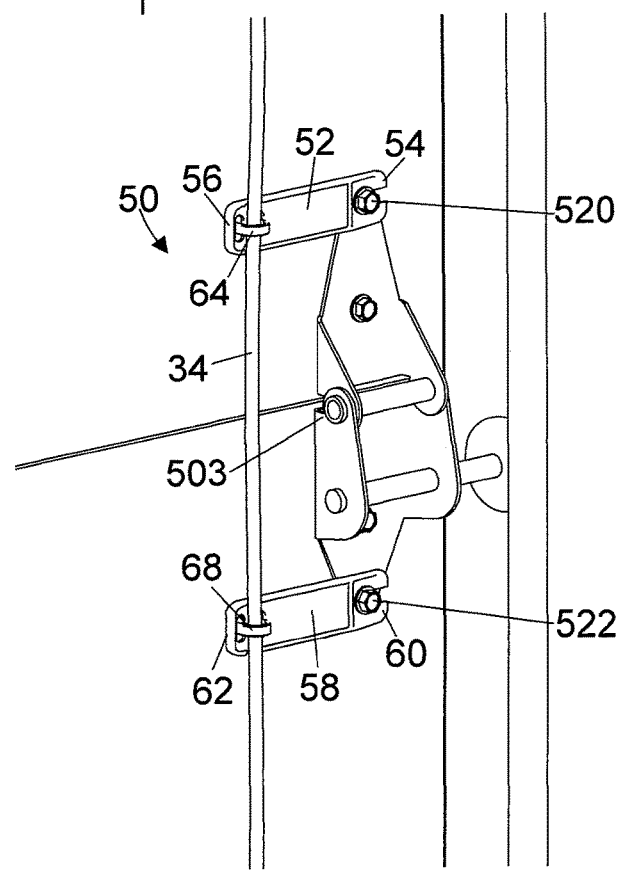
FIG. 22 is a perspective view of FIG. 21.
Figure 23:
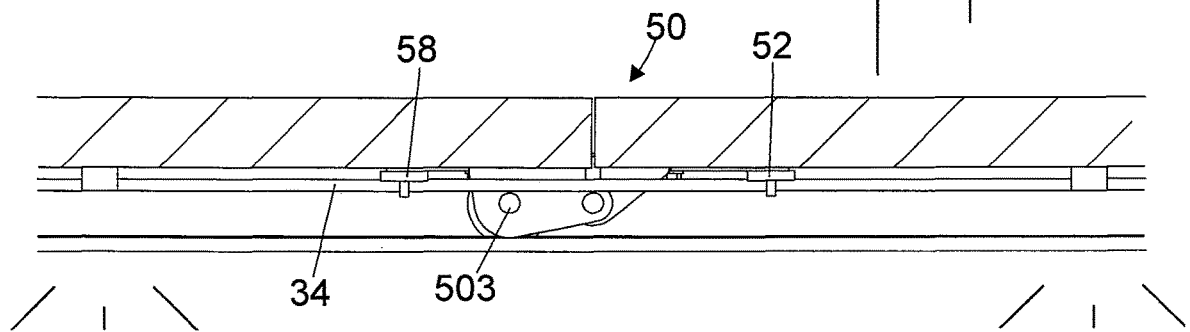
FIG. 23 is an enlarged view of area 23 of FIG. 20.

FIG. 16 is a schematic diagram of lighting system 20 showing power supply 24, movable contactor 26, fixed contactor 28, lights 22, and harness 34.

It may be appreciated that lighting system 20 can be combined with a sectional door to form a lighted structure 600/602.

Referring to FIGS. 5-6, movable electric contactor 26 and fixed electric contactor 28 must be aligned in three dimensions in order make contact when sectional door 500 is in the open horizontal overhead position. In an embodiment, to effect this alignment the following procedure is used:

Now referring to FIGS. 17-23, there is illustrated an apparatus 50 for connecting a wiring harness 34 to a sectional door 500, the sectional door 500 having a plurality of panels 502 (four in the shown embodiment) in which adjacent panels 502 are connected by a hinge 503. The wiring harness 34 is connected to a plurality of lights 22. It is noted that in the shown embodiment two hinges 503 connect each pair of adjacent panels 502. The hinge 503 is connected to the adjacent panels by first and second hinge connectors 520 and 522 respectively (such as threaded bolts, threaded screws, rivets, or the like, refer to FIG. 19). It is noted that in the shown embodiment, four hinge connectors are actually used.

A first bracket 52 has a proximal end 54 and an opposite distal end 56, the distal end 56 is shaped and dimensioned to receive wiring harness 34. Proximal end 54 of first bracket 52 is connectable to hinge 503 by hinge connector 520. A second bracket 58 has a proximal end 60 and an opposite distal end 62, distal end 62 is shaped and dimensioned to receive wiring harness 34. Proximal end 60 of second bracket 58 is connectable to hinge 503 by second hinge connector 522. Also referring to FIGS. 29-32, the proximal ends 54 and 60 respectively of first bracket 52 and second bracket 58 are bifurcated. In the shown embodiment first hinge connector 520 and second hinge connector 522 are threaded connectors (such as bolts or screws). First bracket 52 is connected to hinge 503 by loosening first hinge connector 520, inserting the bifurcated distal end 54 underneath the head of first hinge connector 520, and then re-tightening first hinge connector 520. Similarly, second bracket 58 is connected to hinge 503 by loosening second hinge connector 522, inserting the bifurcated distal end 62 underneath the head of second hinge connector 522, and then re-tightening second hinge connector 522. It is noted that two brackets are similarly connected to each of the other hinges 503 on one side of sectional door 500 (three total as shown).

The distal end 56 of first bracket 52 and the distal end 62 of second bracket 58 are each configured to fixedly connect to wiring harness 34. That is, harness 34 is connected to the brackets so that it cannot longitudinally move, and so that a segment of wiring harness 34 is connected between the two brackets. Also referring to FIGS. 28-32, to accomplish this, a first connector 64 is configured to connect wiring harness 34 to distal end 56 of first bracket 52. The distal end 56 of first bracket 52 includes two apertures 66. First connector 64 is positioned through the two apertures 66 in distal end 56 of first bracket 52, wrapped around wiring harness 34, and connected to itself to firmly connect wiring harness 34 to first bracket 52. Similarly a second connector 68 is configured to connect wiring harness 34 to distal end 62 of second bracket 58. The distal end 62 of second bracket 58 includes two apertures 70. Second connector 68 is positioned through the two apertures 70 in distal end 62 of second bracket 58, wrapped around wiring harness 34, and connected to itself to firmly connect wiring harness 34 to second bracket 58. In the shown embodiment, first connector 66 and second connector 68 are zip-ties.

In FIG. 19 it is noted that adjacent panels 502 each have a horizontal edge 507 and 509. First bracket 52 has a first longitudinal axis 72 and second bracket 58 has a second longitudinal axis 74. First longitudinal axis 72 and second longitudinal axis 74 are both disposed parallel to the horizontal edges 507 and 509 of the adjacent panels 502.

Figure 24:
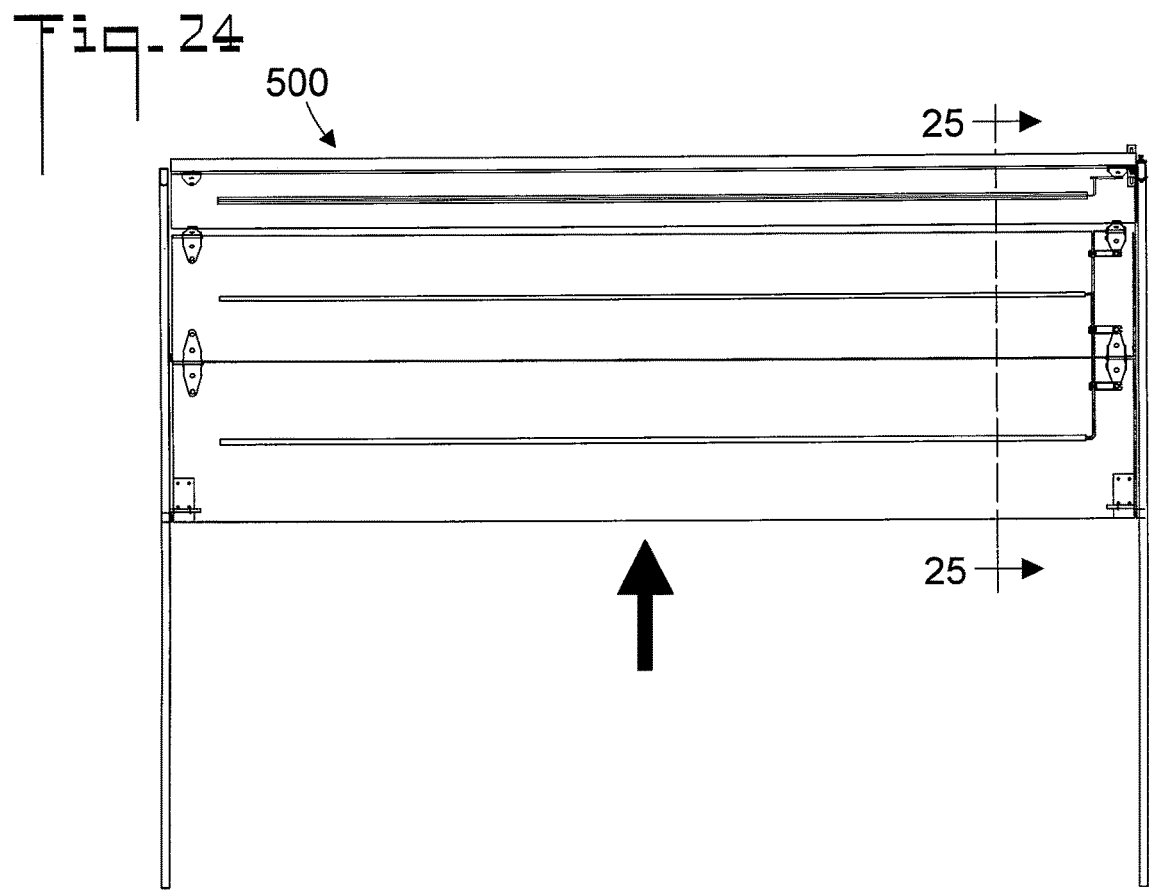
FIG. 24 is an elevation view of the inside of the sectional door showing the door in a transition position between the closed position of FIG. 17 and the open position of FIG. 18.
Figure 25:
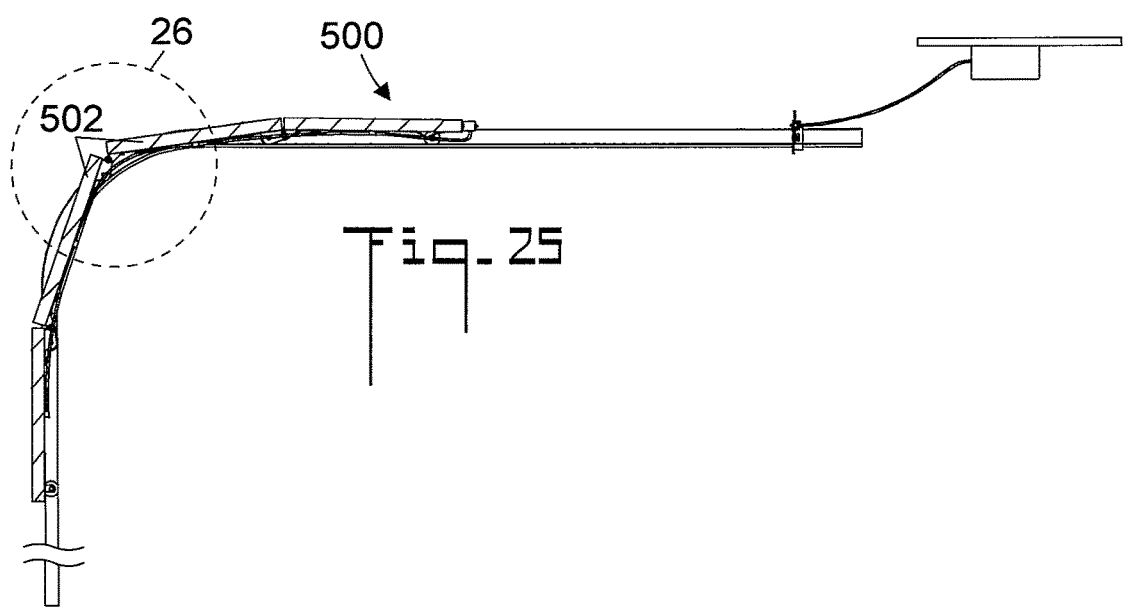
FIG. 25 is a cross sectional view along the line 25-25 of FIG. 24.

FIG. 24 is an elevation view of the inside of the sectional door 500 showing the door in a transition position between the closed position of FIG. 17 and the open position of FIG. 18. FIG. 25 is a cross sectional view along the line 25-25 of FIG. 24 showing sectional door 500 in a transition position between the closed position of FIG. 17 and the open position of FIG. 18. In this position it is noted that adjacent panels 502 form an angle. FIG. 26 is an enlarged view of area 26 of FIG. 25, and FIG. 27 is a perspective view of FIG. 26. It is noted that in the transition position the segment of wiring harness 34S which is located between first bracket 52 and second bracket 58 bends. However, the segments of wiring harness 34 which are located outside of the brackets do not move or bend. Because first connector 64 fixedly connects wiring harness 34 to first bracket 52, and second connector 68 fixedly connects wiring harness 34 to second bracket 58, the brackets confine wiring harness 34 movement (i.e. bending) to the segment 34S located between the brackets, and thereby relieve any strain on the segments of wiring harness 34 which are not between the brackets. This strain relief feature ensures that the connection of wiring harness 34 to lights 22 will not be strained when sectional door 500 moves between its closed and open positions. In the shown embodiment, connectors 64 and 68 are zip ties, however other connectors such as wire, tape, belts, string, clamps, clips, or the like could also be utilized so long as they provide a firm connection of wiring harness 34 to the brackets.

FIG. 28 is an enlarged cross sectional view along the line 28-28 of FIG. 19, showing the connection of wiring harness 34 to first bracket 52 (58). First connector 64 (68) wraps around wiring harness 34, passes through apertures 66 (70), and connects to itself. It is noted that first bracket 52 (58) has a first groove 76 (78) which is shaped and dimensioned to receive wiring harness 34, and thereby provide a tighter connection with first bracket 52 (58). Since in the shown embodiment first bracket 52 and second bracket 58 are the same, in the above description the parenthetical reference numerals apply to second bracket 58. Also, in FIG. 28, the second number applies to second bracket 58.

FIGS. 29-32 show views of first bracket 52 and second bracket 58. In the shown embodiment first bracket 52 and second bracket 58 are identical, so second bracket 58 is also depicted as the second number. It is noted that proximal end 54 of first bracket 52 and of the proximal end 60 of second bracket 58 are bifurcated. The distal end 56 of first bracket 52 has a first groove 76 which is shaped and dimensioned to partially receive the wiring harness 34. The distal end 62 of the second bracket 58 has a second groove 78 which is shaped and dimensioned to partially receive the wiring harness 34. And, the distal end 56 of first bracket 52 has two apertures 66, and the distal end 62 of second bracket 58 has two apertures 70.

It may be appreciated that apparatus 20 may be combined with sectional door 500 to form a system for connecting a wiring harness to a sectional door.

In terms of use, a method for connecting a wiring system includes (refer to FIGS. 17-32):

(a) providing a sectional door 500 having a plurality of panels 502 in which adjacent panels 500 are connected by a hinge 503, the hinge 503 is connected to the adjacent panels 500 by first 520 and second 522 hinge connectors;

(b) providing a wiring harness 34;

(c) providing apparatus 20 for connecting the wiring harness 34 to the sectional door 500, including:

a first bracket 52 having a proximal end 54 and an opposite distal end 56, the distal end 56 is shaped and dimensioned to receive the wiring harness 500;

a second bracket 58 having a proximal end 60 and an opposite distal end 62, the distal end 62 is shaped and dimensioned to receive the wiring harness 34;

a first connector 64;

a second connector 68;

(d) using the first hinge connector 520 to connect the proximal end 54 of the first bracket 52 to the hinge 503;

(e) using the second hinge connector 522 to connect the proximal end 60 of the second bracket 58 to the hinge 503;

(f) using the first connector 64 to connect the wiring harness 34 to the distal end 56 of the first bracket 52; and, (g) using the second connector 68 to connect the wiring harness 34 to the distal end of the second bracket 58.

The method further including:

in (a), the sectional door 500 having a closed position; and, prior to (f) and (g) placing the sectional door 500 in the closed position.

The method further including:

in (c), the distal end 56 of the first bracket 52 having a first groove 76 which is shaped and dimensioned to partially receive the wiring harness 34;

during (f), positioning the wiring harness 34 in the first groove 76;

in (c), the distal end 62 of the second bracket 58 having a second groove 78 which is shaped and dimensioned to partially receive the wiring harness 34; and, during (g), positioning the wiring harness 34 in the second groove 78.

The method further including:

in (c), the first connector 64 being a zip tie; and, in (c), the second connector 68 being a zip tie.

The method further including:

in (a), the sectional door having a plurality of hinges 503; and, repeating (a) through (g) for each hinge 503 of the plurality of hinges 503.

As applicable, the order of performance of the above cited method steps can be changed.

The embodiments of the apparatus, system, and method for connecting a wiring harness to a sectional door described herein are exemplary and numerous modifications, combinations, variations, and rearrangements can be readily envisioned to achieve an equivalent result, all of which are intended to be embraced within the scope of the appended claims. Further, nothing in the above-provided discussions of the apparatus, system, and method should be construed as limiting the invention to a particular embodiment or combination of embodiments. The scope of the invention is defined by the appended claims.

I claim:

1. Apparatus for connecting a wiring harness to a sectional door, the sectional door having a plurality of panels in which adjacent panels are connected by a hinge, the hinge connected to the adjacent panels by first and second hinge connectors, the apparatus comprising:

a first bracket having a proximal end and an opposite distal end, said distal end is shaped and dimensioned to receive the wiring harness;

said proximal end of said first bracket is connectable to the hinge by the first hinge connector;

a second bracket having a proximal end and an opposite distal end, said distal end is shaped and dimensioned to receive the wiring harness;

said proximal end of said second bracket is connectable to the hinge by the second hinge connector; and, said distal end of said first bracket and said distal end of said second bracket are each configured to connect to the wiring harness.

2. The apparatus according to claim 1, further including:

said proximal end of said first bracket being bifurcated; and, said proximal end of said second bracket being bifurcated.

3. The apparatus according to claim 1, further including:
said distal end of said first bracket having a first groove which is shaped and dimensioned to partially receive the wiring harness; and,
said distal end of said second bracket having a second groove which is shaped and dimensioned to partially receive the wiring harness.

4. The apparatus according to claim 1, further including:
said distal end of said first bracket having two apertures; and,
said distal end of said second bracket having two apertures.

5. The apparatus according to claim 4, further including:
a first connector which is configured to connect the wiring harness to said distal end of said first bracket;
said first connector is positionable through said two apertures in said distal end of said first bracket;
a second connector which is configured to connect the wiring harness to said distal end of said second bracket; and,
said second connector is positionable through said two apertures in said distal end of said second bracket.

6. The apparatus according to claim 5, further including:
said first connector being a zip tie; and,
said second connector being a zip tie.

7. The apparatus according to claim 1, the adjacent panels each having a horizontal edge, the apparatus further including:
said first bracket having a first longitudinal axis;
said second bracket having a second longitudinal axis; and,
said first longitudinal axis and said second longitudinal axis are both configured to be disposed parallel to the horizontal edges of the adjacent panels.

8. The apparatus according to claim 1, further including:
said proximal end of said first bracket being bifurcated;
said proximal end of said second bracket being bifurcated;
said distal end of said first bracket having a first groove which is shaped and dimensioned to partially receive the wiring harness;
said distal end of said second bracket having a second groove which is shaped and dimensioned to partially receive the wiring harness;
said distal end of said first bracket having two apertures;
said distal end of said second bracket having two apertures;
a first connector which is configured to connect the wiring harness to said distal end of said first bracket;
said first connector is positionable through said two apertures in said distal end of said first bracket;
a second connector which is configured to connect the wiring harness to said distal end of said second bracket;
said second connector is positionable through said two apertures in said distal end of said second bracket;
said first connector being a zip tie; and,
said second connector being a zip tie.

9. A wiring system, comprising:
a sectional door having a plurality of panels in which adjacent panels are connected by a hinge;
said hinge connected to said adjacent panels by first and second threaded connectors;
a wiring harness;
a first bracket having a proximal end and an opposite distal end, said distal end is shaped and dimensioned to receive said wiring harness;
said proximal end of said first bracket is connected to said hinge by said first hinge connector;
a second bracket having a proximal end and an opposite distal end, said distal end is shaped and dimensioned to receive said wiring harness;
said proximal end of said second bracket is connected to said hinge by said second hinge connector; and,
said wiring harness is connected to said distal end of said first bracket and to said distal end of said second bracket.

10. The wiring system according to claim 9, further including:
said proximal end of said first bracket being bifurcated; and,
said proximal end of said second bracket being bifurcated.

11. The wiring system according to claim 9, further including:
said distal end of said first bracket having a first groove which is shaped and dimensioned to partially receive said wiring harness; and,
said distal end of said second bracket having a second groove which is shaped and dimensioned to partially receive said wiring harness.

12. The wiring system according to claim 9, further including:
said distal end of said first bracket having two apertures; and,
said distal end of said second bracket having two apertures.

13. The wiring system according to claim 12, further including:
a first connector which connects said wiring harness to said distal end of said first bracket;
said first connector is positioned through said two apertures in said distal end of said first bracket;
a second connector which connects said wiring harness to said distal end of said second bracket; and,
said second connector is positioned through said two apertures in said distal end of said second bracket.

14. The wiring system according to claim 13, further including:
said first connector being a zip tie; and,
said second connector being a zip tie.

15. The wiring system according to claim 9, further including:
said first bracket having a first longitudinal axis;
said second bracket having a second longitudinal axis;
said adjacent panels each having a horizontal edge; and,
said first longitudinal axis and said second longitudinal axis are both disposed parallel to said horizontal edges of said adjacent panels.

16. The wiring system according to claim 9, further including:
said plurality of panels are connected together by a plurality of hinges; and,
one said first bracket and one said second bracket are connected to each said hinge of said plurality of hinges.

17. A method for connecting a wiring system, comprising:
(a) providing a sectional door having a plurality of panels in which adjacent panels are connected by a hinge, said hinge connected to said adjacent panels by first and second hinge connectors;
(b) providing a wiring harness;
(c) providing apparatus for connecting said wiring harness to said sectional door, including:

a first bracket having a proximal end and an opposite distal end, said distal end shaped and dimensioned to receive said wiring harness;

a second bracket having a proximal end and an opposite distal end, said distal end shaped and dimensioned to receive said wiring harness;

a first connector;

a second connector;

(d) using said first hinge connector to connect said proximal end of said first bracket to said hinge;

(e) using said second hinge connector to connect said proximal end of said second bracket to said hinge;

(f) using said first connector to connect said wiring harness to said distal end of said first bracket; and, (g) using said second connector to connect said wiring harness to said distal end of said second bracket.

18. The method of claim 17, further including:

in (a), said sectional door having a closed position; and, prior to (f) and (g) placing said sectional door in said closed position.

19. The method of claim 17, further including:

in (c), said distal end of said first bracket having a first groove which is shaped and dimensioned to partially receive said wiring harness;

during (f), positioning said wiring harness in said first groove;

in (c), said distal end of said second bracket having a second groove which is shaped and dimensioned to partially receive said wiring harness; and, during (f), positioning said wiring harness in said second groove.

20. The method of claim 17, further including:

in (c), said first connector being a zip tie; and, in (c), said second connector being a zip tie.

21. The method of claim 17, further including:

in (a), said sectional door having a plurality of hinges; and, repeating (a) through (g) for each hinge of said plurality of hinges.

* * * * *